United States Patent [19]
Ozaki et al.

[11] Patent Number: 5,544,491
[45] Date of Patent: Aug. 13, 1996

[54] ABYSSAL CASTING APPARATUS FOR LIQUEFIED CARBONATED GAS

[75] Inventors: Masahiko Ozaki; Keisuke Sonoda; Hiroshi Kikuchi; Osamu Tsukamoto; Masao Komatsu, all of Nagasaki; Koetsu Asai, Tokyo, all of Japan

[73] Assignee: Mitsubishi Jukogyo Kabushiki Kaisha, Tokyo, Japan

[21] Appl. No.: 398,163

[22] Filed: Mar. 2, 1995

[30] Foreign Application Priority Data

| Mar. 3, 1994 | [JP] | Japan | 6-033481 |
| Mar. 30, 1994 | [JP] | Japan | 6-060962 |
| Apr. 20, 1994 | [JP] | Japan | 6-104581 |

[51] Int. Cl.⁶ .................................................. F17C 1/00
[52] U.S. Cl. ........................... 62/53.1; 62/240; 588/250
[58] Field of Search .................... 62/53.1, 240; 588/250; 405/203, 210

[56] References Cited

U.S. PATENT DOCUMENTS 5,293,751  3/1994  Asai ................................. 62/53.1

FOREIGN PATENT DOCUMENTS

0429154  5/1991  European Pat. Off. .
0463663  1/1992  European Pat. Off. .

Primary Examiner—Ronald C. Capossela
Attorney, Agent, or Firm—Wenderoth, Lind & Ponack

[57] ABSTRACT

A liquefied carbonated gas abyssal casting apparatus prevents freezing at an outlet of a casting tube and flotation of cast carbonated gas. The liquefied carbonated gas is fed from a reservoir to a single casting tube and discharged to the abyss through an inner tube of a double casting tube from a lower end of the single casting tube. A heat medium fluid is recirculated between the inner tube and an outer tube of the double casting tube. The liquefied carbonated gas which flows through the inner tube is heated to an abyssal temperature of from −1° to 5° C.

9 Claims, 12 Drawing Sheets

ABYSSAL CASTING APPARATUS FOR LIQUEFIED CARBONATED GAS

BACKGROUND OF THE INVENTION

The present invention relates to an apparatus for collecting and treating carbonated gas in order to deal with so-called global warming or warming-up of the earth, and more particularly to an apparatus for casting collected carbonated gas into an abyss.

It has been considered, as one countermeasure for the global warming, to collect carbonated gas from burnt exhaust gas and to cast it into the abyss, i.e. the sea. For example, in Japanese Patent Laid-Open No. Hei 3-128792, an apparatus and a method are proposed which replace the sea water within a casting tube by gas and thereafter cast carbonated gas into the abyss through the casting tube.

Figure 14:
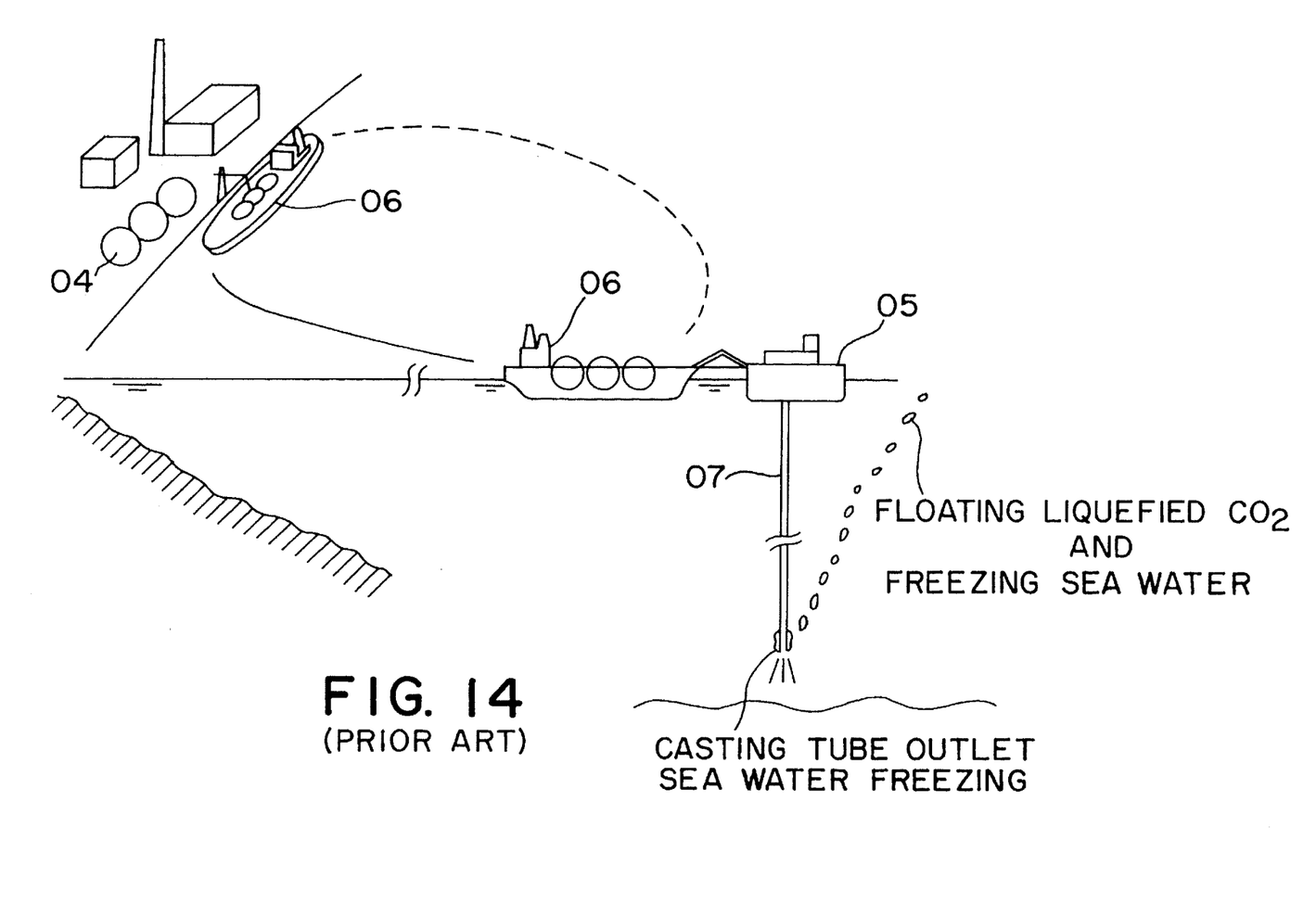
FIG. 14 is an illustration of a conventional carbonated gas abyssal casting system.

FIG. 14 is an overall schematic view showing an abyssal casting system for carbonated gas. In FIG. 14, reference character 04 denotes a carbonated gas processing plant on the earth, from which liquefied carbonated gas is transferred to a base 05 on the sea by a transport vessel. The liquefied carbonated gas is cast into the abyss through a casting tube 07 from the base 05 on the sea.

However, if the liquefied carbonated gas is cast into the abyss at an extremely low temperature, the sea water is frozen, and there is a fear that not only would an outlet of the casting tube 07 be clogged but also that the sea water around the tube would be frozen so as to be floated together with the liquefied carbonated gas. No countermeasure for this has yet been developed.

In the case where such liquefied carbonated gas is reserved in a reservoir tank under the condition of −55° C. and 0.6 MPa and is cast into the abyss through the casting tube under this condition, if the heat transfer between the periphery of the tube and the sea water is insufficient, the temperature of the liquefied gas would not be raised even at the casting tube outlet and the carbonated gas would be discharged at the low temperature therefore not only would the tip end portion of the casting tube be clogged by the frozen sea water, but also the liquefied carbonated gas would float to the sea surface together with the frozen sea water.

In particular, the upper portion of the casting tube is kept at a lower temperature. The sea water is frozen around the outer surface of the casting tube. Furthermore, the heat transfer from the sea water to the interior of the casting tube is prevented.

Thus, the castable amount of carbonated gas for the constant casting tube is restricted by the amount of the heat transfer with the sea water around the periphery of the tube.

On the other hand, in order to elevate the temperature of the liquefied carbonated gas upon casting, the applied pressure should be increased to maintain the liquefied condition. This condition is a relatively high pressure condition (at 6 MPa, because a saturated pressure at a temperature of 20° C. is 5.85 MPa). However, it is difficult to handle the high pressure gas.

Also, it is necessary to adjust the release pressure to the same pressure as that around the open lower end of the casting tube to prevent the gasification of the carbonated gas in the middle stage. However, it is difficult to carry out the pressure adjustment for preventing the freezing while preventing the gasification.

SUMMARY OF THE INVENTION

An object of the present invention is to provide a carbonated gas abyssal casting apparatus for casting carbonated gas into the abyss through a casting tube extending into the abyss for preventing freezing at an outlet of a casting tube and floating of the cast carbonated gas.

In order to attain the above-noted object according to the present invention, there is provided an abyssal casting apparatus for casting liquefied carbonated gas into an abyss through a casting tube extending from a liquefied carbonated gas reservoir on a base on the sea and reaching the abyss. The apparatus comprises a liquefied carbonated gas casting tube whose upper end portion is mounted on said base on the sea and whose lower end portion is opened at a casting position in the abyss, and has a length of at least 3,000 m. A direct heating portion that is directly heated by the sea water therearound heats the liquefied carbonated gas along a length of at least 100 m of the casting tube from the sea level. A forcible heating device heated by a heat medium fluid fed by a pump is provided to at least one of casting tube portions upstream and downstream of the direct heating portion to thereby heat the liquefied carbonated gas within the casting tube.

It is known that in general, the temperature of the sea water is high close to surface layer thereof, and is stable at several °C. at a level lower than a certain depth of water. This depth of water is referred to as a temperature boundary layer. The temperature boundary layer generally varies in the range of 100 to 500 m depending upon the sea region or the season.

In the apparatus according to the present invention, a direct heating portion for heating the liquefied carbonated gas with the sea water around the casting tube is formed in the casting tube portion having a length of at least 100 m from the sea level above the temperature boundary layer.

The forcible heating device is provided so that the heat medium fluid is fed by a pump to the casting tube portion on at least one of the upstream side and the downstream side of the direct heating portion to heat the liquefied carbonated gas within the casting tube.

The sea water or freeze may be used as the heat medium fluid to be used in the forcible heating device.

The forcible heating device may comprise a heat exchanger provided on the base on the sea surface upstream of the direct heating portion and a sea water pump for feeding the sea water to the heat exchanger. A plurality of pressure adjusting devices for adjusting the pressure of the carbonated gas are provided on the casting tube.

Thus, by providing the heat exchanger, it is possible to cast carbonated gas in a desired manner. Also, by providing the plurality of pressure adjusting devices, it is possible to control the pressure of carbonated gas within the casting tube in a multi-stage manner as desired. At the upper portion of the casting tube, the pressure is maintained so as not to gasify the liquefied carbonated gas, and the pressure at the lower end of the casting tube may be substantially equal to the sea water pressure at its depth of water.

The forcible heating device may comprise a tubular member mounted downstream of the direct heating portion around an outer circumferential portion of the casting tube with a space to form a double wall structure and a sea water flowing means for forcibly flowing the sea water into the space. With such a structure, it is possible to adjust the amount of heat exchange with the liquefied carbonated gas within the casting tube inner tube with the sea water forcibly flowing through the outer portion of the casting tube for the liquefied carbonated gas. It is possible to elevate the temperature of the liquefied carbonated gas up to the same temperature as that of the sea water at and around the lower end of the casting tube to thereby prevent the freezing of the sea water caused by discharging the liquefied carbonated gas.

Accordingly, in the apparatus according to the invention, it is possible to prevent the clogging of the casting tube end by freezing, and to prevent the floating of the liquefied carbonated gas after being discharged.

Thus, it is desirable that the position where the tubular member for surrounding the outer portion of the casting tube is provided is in the abyssal temperature region (the depth of water, about 400 m), and its length is selected so that the temperature of the liquefied carbonated gas flowing through the double wall inner tube is heated to the abyss temperature of from −1° C. to 5° C.

Thus, the forcible heating device is provided on the casting tube downstream of the direct heating portion. With this structure, the liquefied carbonated gas is effectively heated by the sea water at the direct heating portion in the sea water high temperature region. In the sea water low-temperature region where the tubular member is provided (the depth of water, about 400 m or more), the liquefied carbonated gas flowing through the casting tube and the tubular member is heated to the abyss temperature of from −1° C. to 5° C. by the heat medium fluid.

Thus, the liquefied carbonated gas is effectively heated by the sea water and the heat medium fluid. It is possible to elevate its temperature up to the same temperature as that of the sea water at the lower end of the casting tube to thereby prevent the freezing of the sea water. Accordingly, it is possible to prevent the clogging of the end of the casting tube by freezing and to prevent the floating of the liquefied carbonated gas after having been discharged.

BRIEF DESCRIPTION OF THE DRAWINGS

In the accompanying drawings:

FIGS. 10 are sectional views of pressure adjusting devices, FIGS. (a)-1 and (a)-2 showing an orifice type and FIGS. b-(1) and b-(2) showing a butterfly type;

DESCRIPTION OF THE PREFERRED EMBODIMENTS (First Embodiment)

A first embodiment shown in FIGS. 1 through 3 will be explained.

Figure 1:
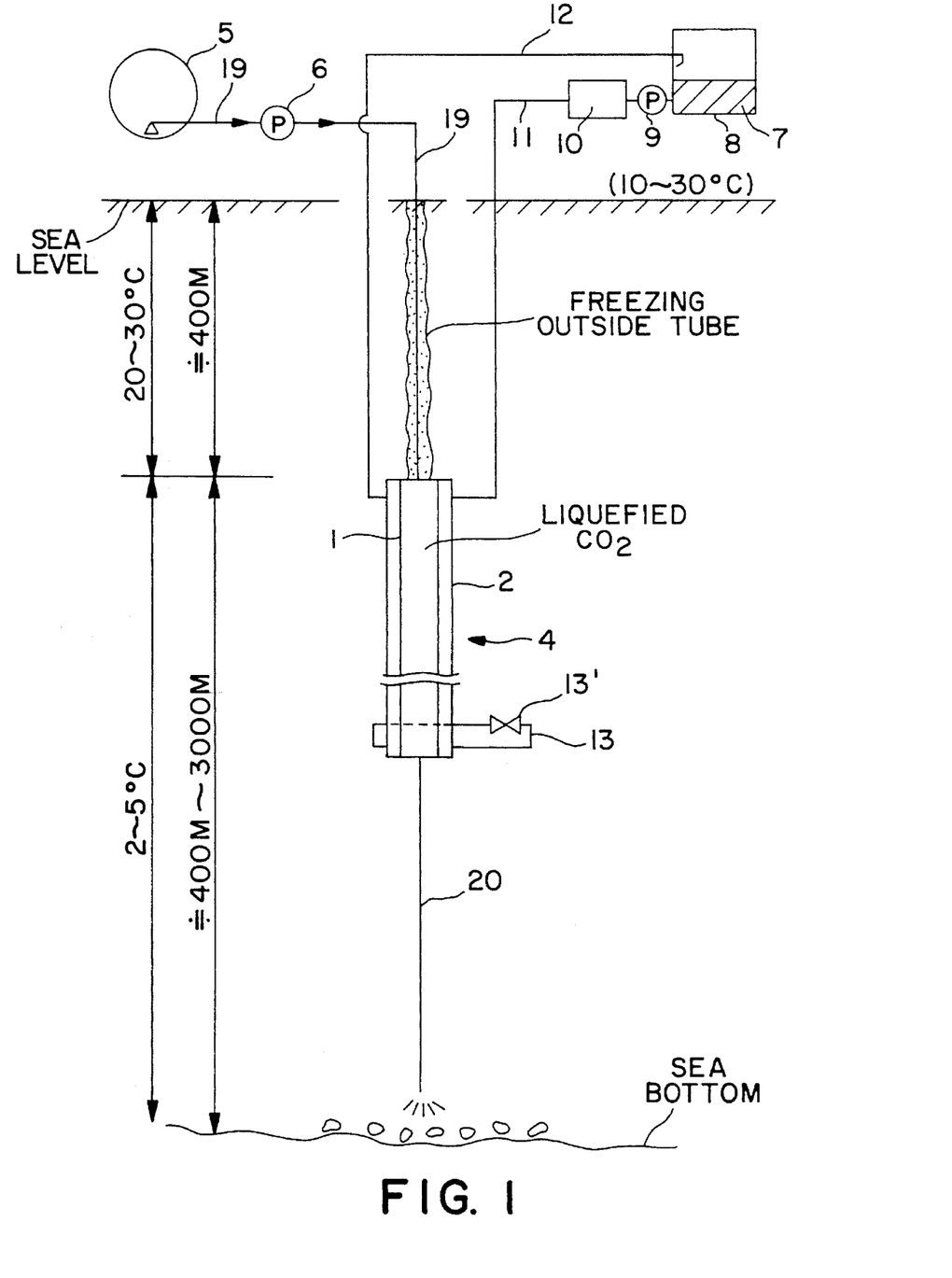
FIG. 1 is a schematic view showing a liquefied carbonated gas abyssal casting apparatus in accordance with a first embodiment of the invention.
Figure 2:
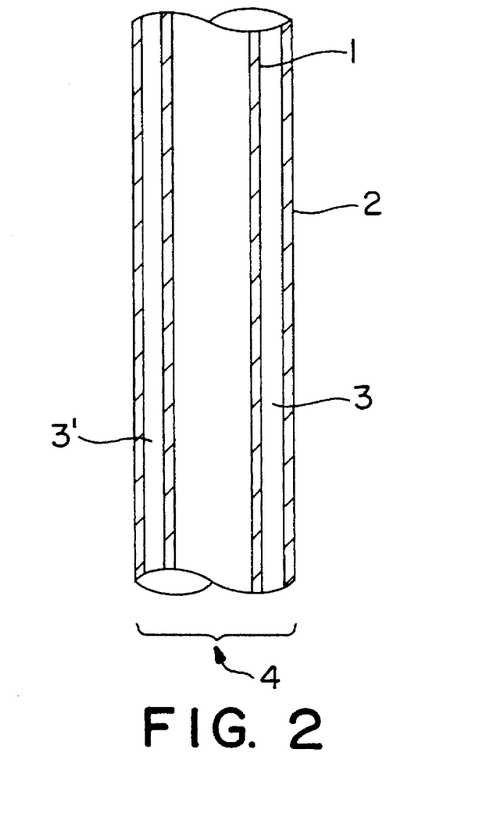
FIG. 2 is a longitudinal-sectional view of a double wall type casting tube used in the apparatus shown in FIG. 1.
Figure 3:
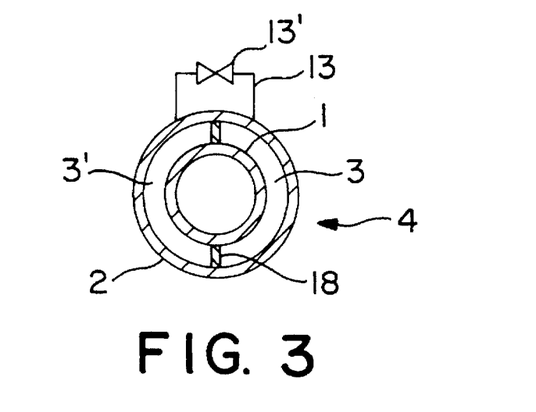
FIG. 3 is a cross-sectional view of the double wall type casting tube used in the apparatus shown in FIG. 2.

In FIGS. 1 to 3, reference numeral 4 denotes a double casting pipe which is composed of a double casting inner tube 1 and a double casting outer tube 2. A space between the inner tube 1 and the outer tube 2 is partitioned into two passages 3 and 3' by partitions 18 as shown in FIG. 3.

Reference numeral 5 denotes a liquefied carbonated gas reservoir tank which is in communication with an upper end of the inner tube 1 of the double casting tube 4 by a liquefied carbonated gas casting tube 19 composed of a single pipe provided with a liquefied carbonated gas feed pump 6 and forming a direct heating portion to be heated by the sea water therearound. The lower end of the inner tube 1 of the double casting tube 4 is in communication with a single casting tube 20.

Reference numeral 8 denotes a heat medium fluid tank filled with a heat medium fluid 7. The tank 8 is connected to the passage 3 of the double casting tube 4 through a heat medium fluid feed line 11 interposed between a heat medium fluid pump 9 and a heater 10.

Also, the heat medium fluid tank 8 is connected to the passage 3' of the double casting tube 4 through a heat medium fluid return line 12. The passages 3 and 3' between the inner tube 1 and the outer tube 2 of the double casting tube 4 are connected at their lower end portions to a heat medium fluid bypass line 13 provided with a bypass valve 13'.

The carbonated gas abyssal casting apparatus according to this embodiment is thus structured. The liquefied carbonated gas is fed from the reservoir tank 5 through the single casting tube 19 and the inner tube 1 of the double casting tube 4 and subsequently through the single casting tube 20 to the abyss by the feed pump 6.

On the other hand, the heat medium fluid (antifreeze) 7 is caused to pass from the reservoir tank 8 through the heater 10 by the pump 9 and heated to a suitable temperature (10° to 30° C.). Thereafter, the heat medium fluid is caused to pass through the feed line 11 and the outer passage 3 of the inner tube 1 of the double casting tube 4 where a heat exchange is effected. The fluid 7 is caused to pass through the heat medium fluid bypass line provided at a suitable position with the valve 13' and to pass through the passage 3' of the double casting tube 4 again back to the reservoir 8. In the meantime, the heat exchange with the liquefied carbonated gas is effected to elevate the temperature of liquefied carbonated gas up to −1° C. to 5° C., which is approximately the same temperature as that of the abyss.

A plurality of bypass lines 13 and valves 13' connecting the passages 3 and 3' on the outside of the inner tube 1 of the double casting tube 4 are provided at suitable positions. The valves 13' located at the suitable positions are opened in accordance with the temperature of the liquefied carbonated gas within the interior of the inner tube 1 to thereby adjust the position (range) where the heat medium fluid flows, whereby the heat exchange may be carried out up to the necessary position of the inner tube 1.

Incidentally, in the embodiment shown, the space between the inner and outer tubes 1 and 2 of the double casting tube 4 is divided into two spaces, one of which is used for feeding the heat medium fluid and the other of which is used for the return line. However, this is just an example. It is therefore possible to dispose the return tube outside of the casting tube.

Assuming that the temperature boundary layer of the sea water is located at the depth of 400 m, for instance, the double tube has a suitable length from the depth of 400 m (at which the heat exchange is possible at the abyssal temperature in accordance with the casting rate of the liquefied carbonated gas.) Through this length, the temperature of the liquefied carbonated gas should be elevated by the heat medium fluid. In this case, the pressure of the liquefied carbonated gas is the hydraulic pressure, for example, 4 MPa or more at this depth. Even if the temperature of carbonated gas is elevated to 0° C. at this position, the liquefied carbonated gas will not be gasified, because the pressure exceeds the saturated pressure of 3.48 MPa at 0° C. Accordingly, it is possible to cast the liquefied carbonated gas into the abyss without controlling the pressure.

Incidentally, when the liquefied carbonated gas is cast into the abyss, the sea water filled into the interiors of the single casting tube 19, the double casting tube 4 and the single casting tube 20 is replaced by gas (for example, gasified carbonated gas).

Also, upon casting the liquefied carbonated gas, since the single casting tube 19 forming the direct heating portion is located at the sea water high temperature region (up to 400 m), the heat exchange may readily be carried out. However, the outer portion of the tube is frozen.

Since the double casting tube 4 is located in the sea water low temperature region (over 400 m), the inner tube 1 is surrounded by the outer tube 2 and the space between the two tubes 1 and 2 is filled with the atmosphere corresponding to the sea water high temperature region.

The length thereof may be selected to such a level that the heat exchange may be carried out in the sea water temperature of from −1° C. to 5° C. in accordance with the casting rate of the liquefied carbonated gas.

Incidentally, the temperature of the liquefied carbonated gas in the single casting tube 20 is the same as that of the abyssal temperature by the provision of the double casting tube 4.

Figure 5:
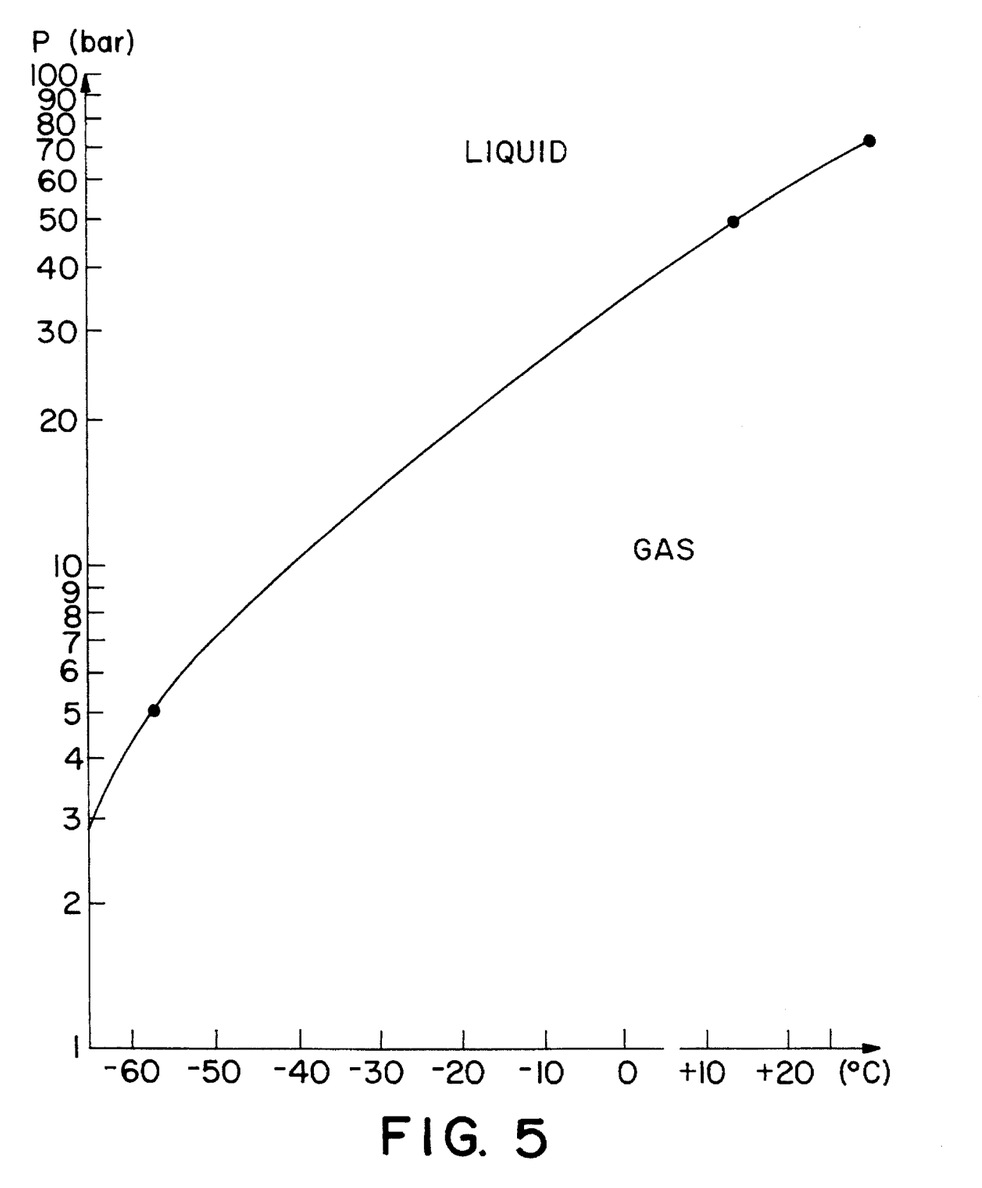
FIG. 5 is a graph showing a characteristic curve of carbonated gas.

Thus, as shown by the characteristic curve of carbonated gas in FIG. 5, the relationship between the liquefied carbonated gas and the pressure in each casting tube shows that the gasification of the liquefied carbonated gas may be prevented. There is no serious problem.

(Second Embodiment)

A casting apparatus according to a second embodiment shown in FIG. 4 will be explained.

Figure 4:
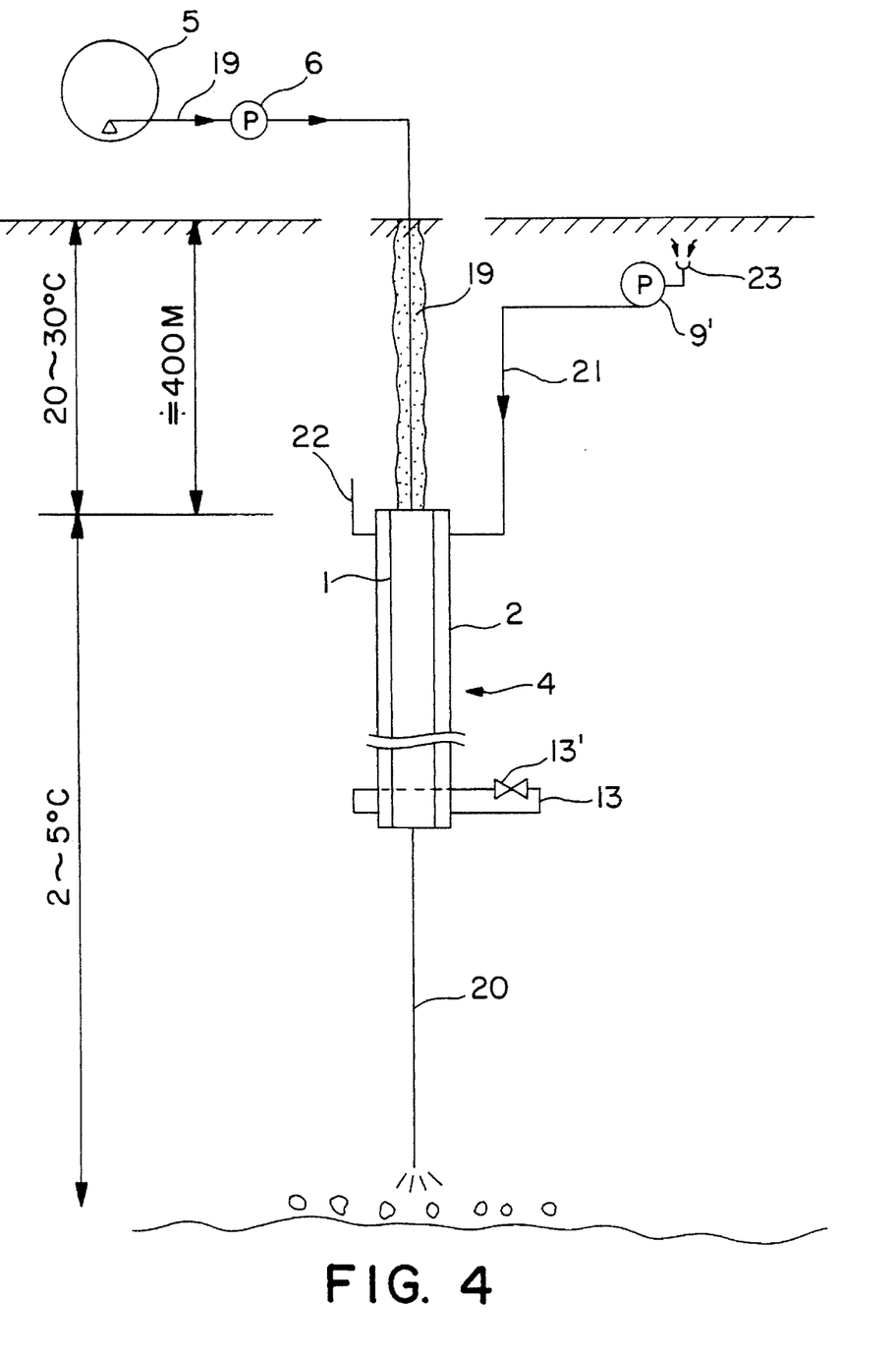
FIG. 4 is a schematic view showing a liquefied carbonated gas abyssal casting apparatus in accordance with a second embodiment of the invention.

In the casting apparatus shown in FIG. 4, the sea water near the sea level is introduced as the heat medium fluid to be supplied between the inner and outer tubes of the double casting tube 4.

Namely, a water suction port 23 is provided close to the sea water, and warm sea water therearound is introduced into the space between the inner and outer tubes 1 and 2 of the double casting tube 4 by a sea water suction tube 21 provided with a sea water pump 9'.

The sea water which has been returned after flowing through the space between the inner and outer tubes 1 and 2 is returned to the sea through a sea water discharge tube 22.

The other structure is the same as that shown in FIG. 1. An explanation therefor will be omitted.

In general, the sea water temperature near the sea level is in the range of from 20° to 30° C. In this embodiment, its heat may be effectively utilized to elevate the temperature of the liquefied carbonated gas to be cast. The other effects and advantages are the same as those in the first embodiment.

Incidentally, in the casting tubes 19 and 20 of the first and second embodiments thus far described, devices for adjusting the pressure of the liquefied carbonated gas within the casting tubes are not shown at all. However, actually, a plurality of pressure adjusting devices such as pressure adjusting valves or orifices are provided for adjusting the pressure of carbonated gas.

(Third Embodiment)

Figure 6:
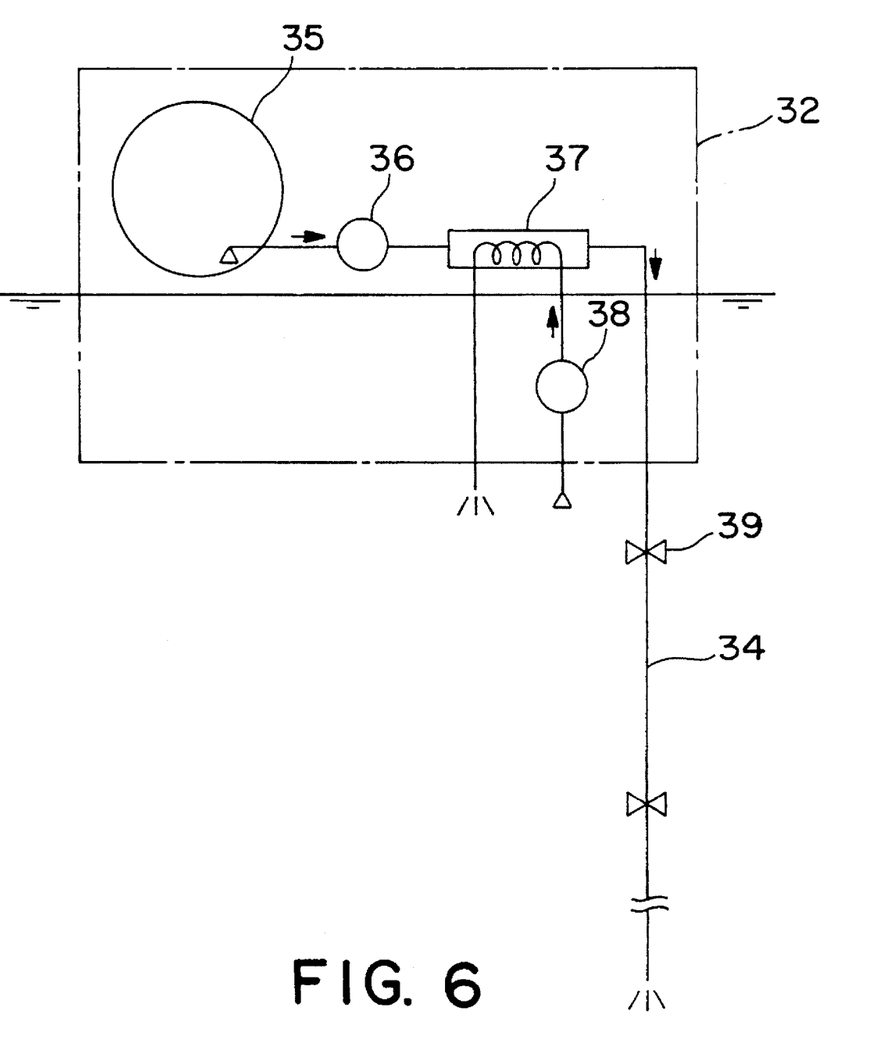
FIG. 6 is a schematic view showing a liquefied carbonated gas abyssal casting apparatus in accordance with a third embodiment of the invention.

FIG. 6 shows a third embodiment and is a systematic view of a carbonated gas handling apparatus provided on the base 32 on the sea. In the base 32 on the sea, carbonated gas received from the transporting vessel is temporarily stored in a tank 35.

A casting tube 34 having a length of about 3,000 m is suspended from the base 32 on the sea. Carbonated gas is cast into the abyss through the casting tube 34 from the tank 35 of the base on the base 32.

The condition of carbonated gas within the tank 35 is about −55° C. and 0.6 MPa. The pressure is increased to about 1.5 MPa by a carbonated gas pump 36. The temperature is elevated to about −30° C. by a carbonated gas temperature elevating device 37. The carbonated gas temperature elevating device 37 is a shell tube type heat exchanger which uses the sea water, supplied by a sea water pump 38, as a heating source. The condition of carbonated gas to be supplied to the casting tube 34 is about −30° C. and 1.5 MPa.

Six (two are shown in FIG. 6) pressure adjusting devices 39, such as pressure adjusting valves or orifices are provided at an interval of about 100 m from the sea level in the casting tube 34 for adjusting the pressure of the carbonated gas within the casting tube.

FIGS. 10(*a*) show an example of an orifice type pressure adjusting device and FIGS. 10(*b*) show an example of a butterfly valve type.

Figure 7:
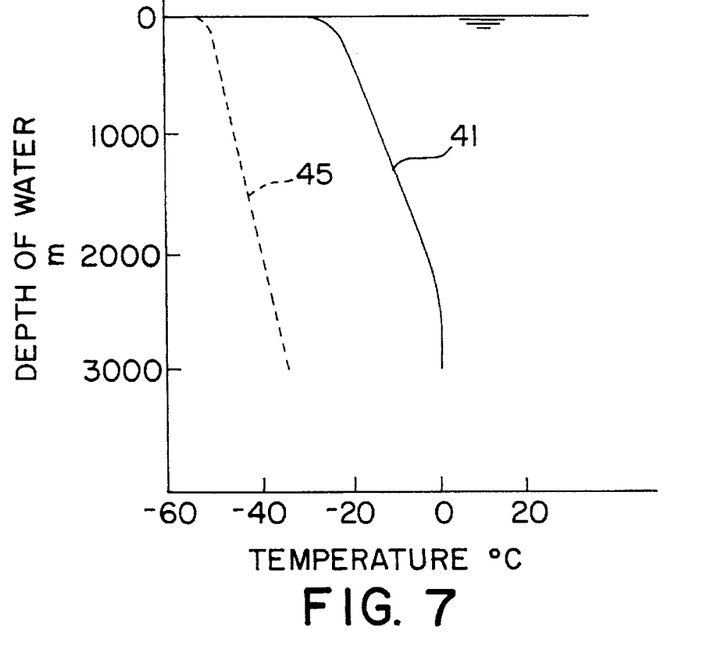
FIG. 7 is a graph showing a temperature of carbonated gas within the casting tube.
Figure 8:
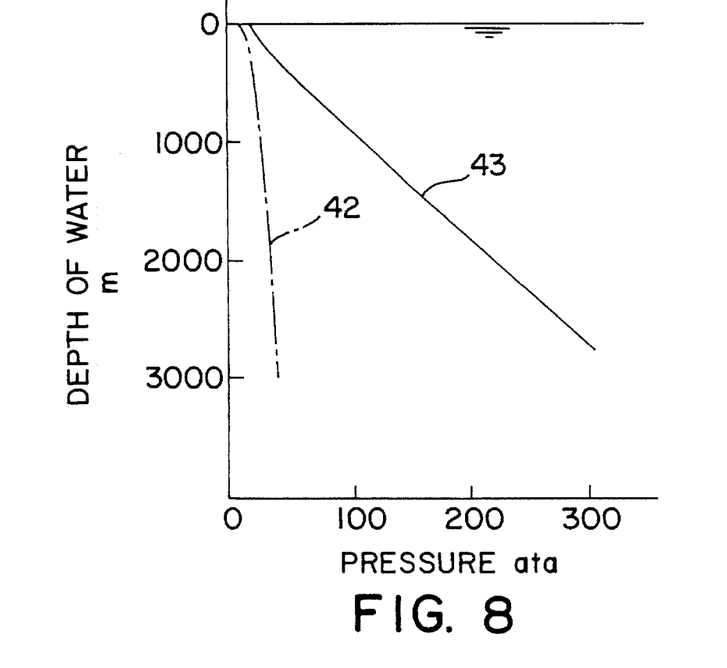
FIG. 8 is a graph showing a pressure of carbonated gas within the casting tube.
Figure 9:
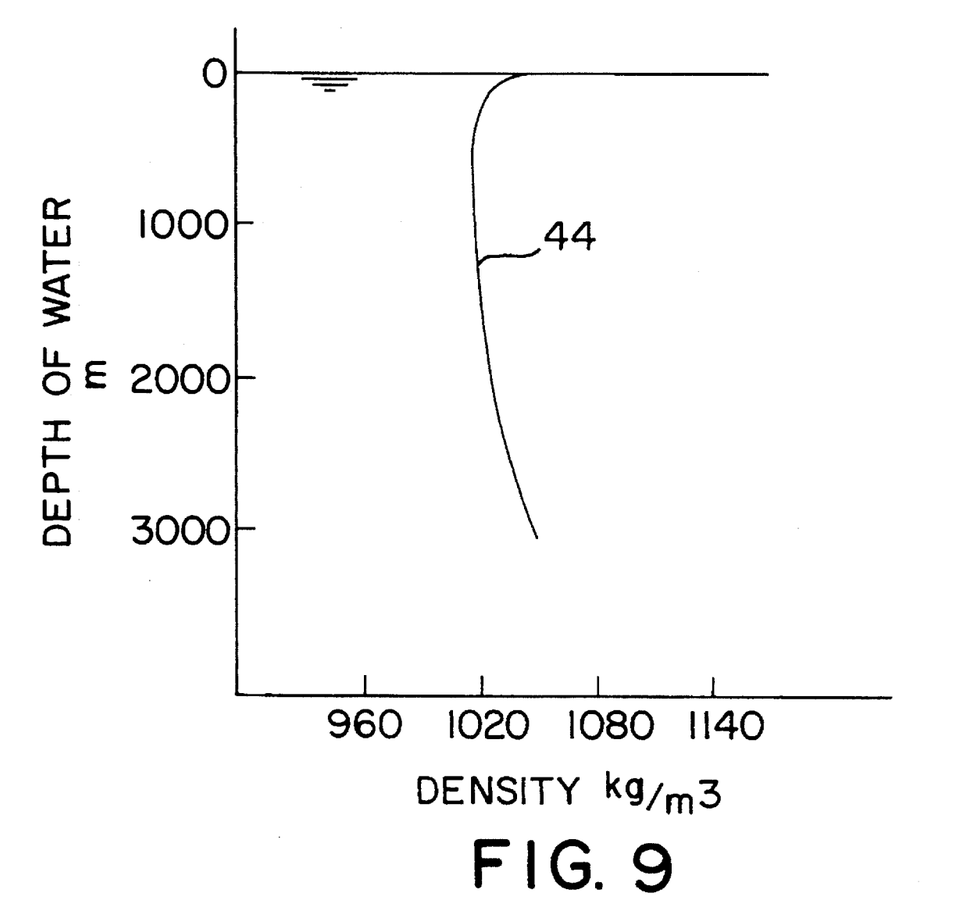
FIG. 9 is a graph showing the density of carbonated gas within the casting tube.
Figure 10A:
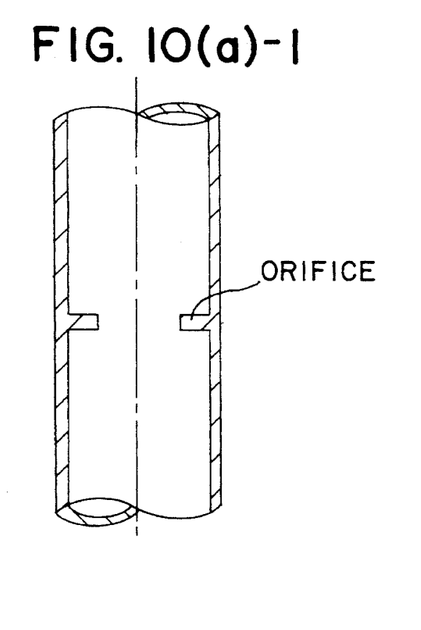
Figure 10A:
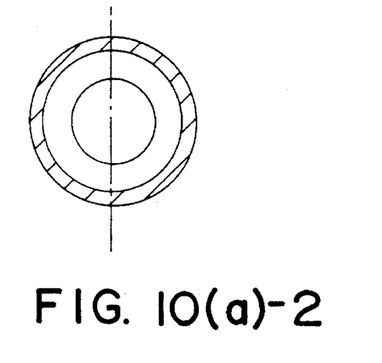
Figure 10B:
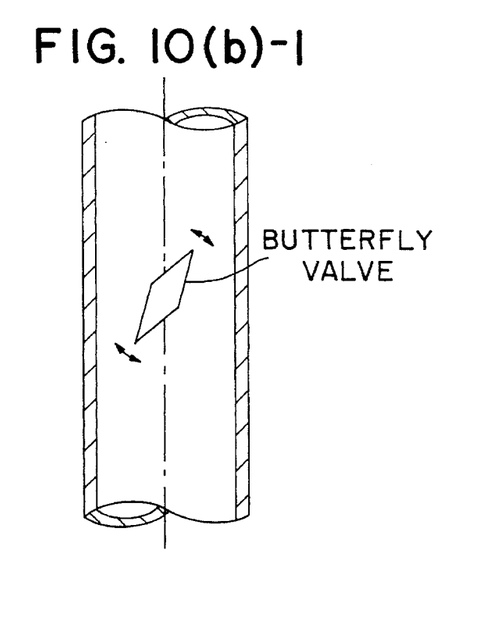
Figure 10B:
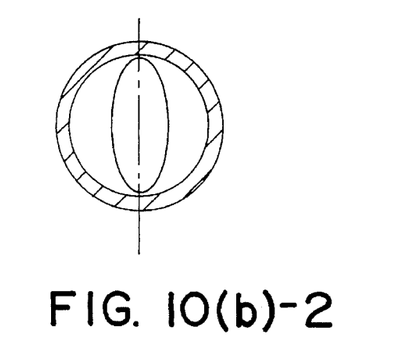

FIGS. 7 to 9 are graphs showing the conditions of carbonated gas within the casting tube. Reference numeral 41 denotes the temperature, reference numeral 43 denotes the pressure and reference numeral 44 denotes the density. The graphs show the fact that the temperature of carbonated gas, −30° C., upon the casting is elevated up to about 2° C. at the lower end of the casting tube by the sea water which is flowing through the casting tube.

The dotted line 45 indicates the temperature of carbonated gas in the case where carbonated gas is cast under the same conditions, except for the elevator of the temperature of the carbonated gas before casting. In this case, the temperature of the carbonated gas at the lower end of the casting tube is about −30° C. The graph shown in FIG. 7 shows the effect due to the elevation of the temperature of the carbonated gas before casting. It is possible to elevate the temperature of the carbonated gas at the lower end of the casting tube by about 2° C. while substantially unchanging the amount of heat transfer from the sea water without decreasing the amount of cast carbonated gas.

The one dot and dash line 42 denotes the saturated vapor pressure of carbonated gas corresponding to the temperature 41 of carbonated gas within the casting tube and shows the fact that the carbonated gas pressure 43 is kept above the saturated vapor pressure.

The density of carbonated gas is changed depending upon the change in temperature and pressure. FIG. 9 shows this condition. As the measurement position is lowered along the casting tube, first of all, the density is decreased by the effect of the elevation of the temperature. But as the depth of water is increased, the effect of the increase of pressure remarkably increases the density. The pressure of carbonated gas within the tube is also controlled in view of the change in density. As shown in FIG. 8, the control is effected so that the pressure is maintained at about 30 MPa at the lower end of the casting tube.

It should be understood that the temperature and pressure of carbonated gas upon casting, the temperature and pressure thereof upon discharging to the abyss, the number and the interval of the pressure adjusting devices and the values of the pumps and the heating devices are exemplified, and the invention is not limited to those examples.

(Fourth Embodiment)

Figure 11:
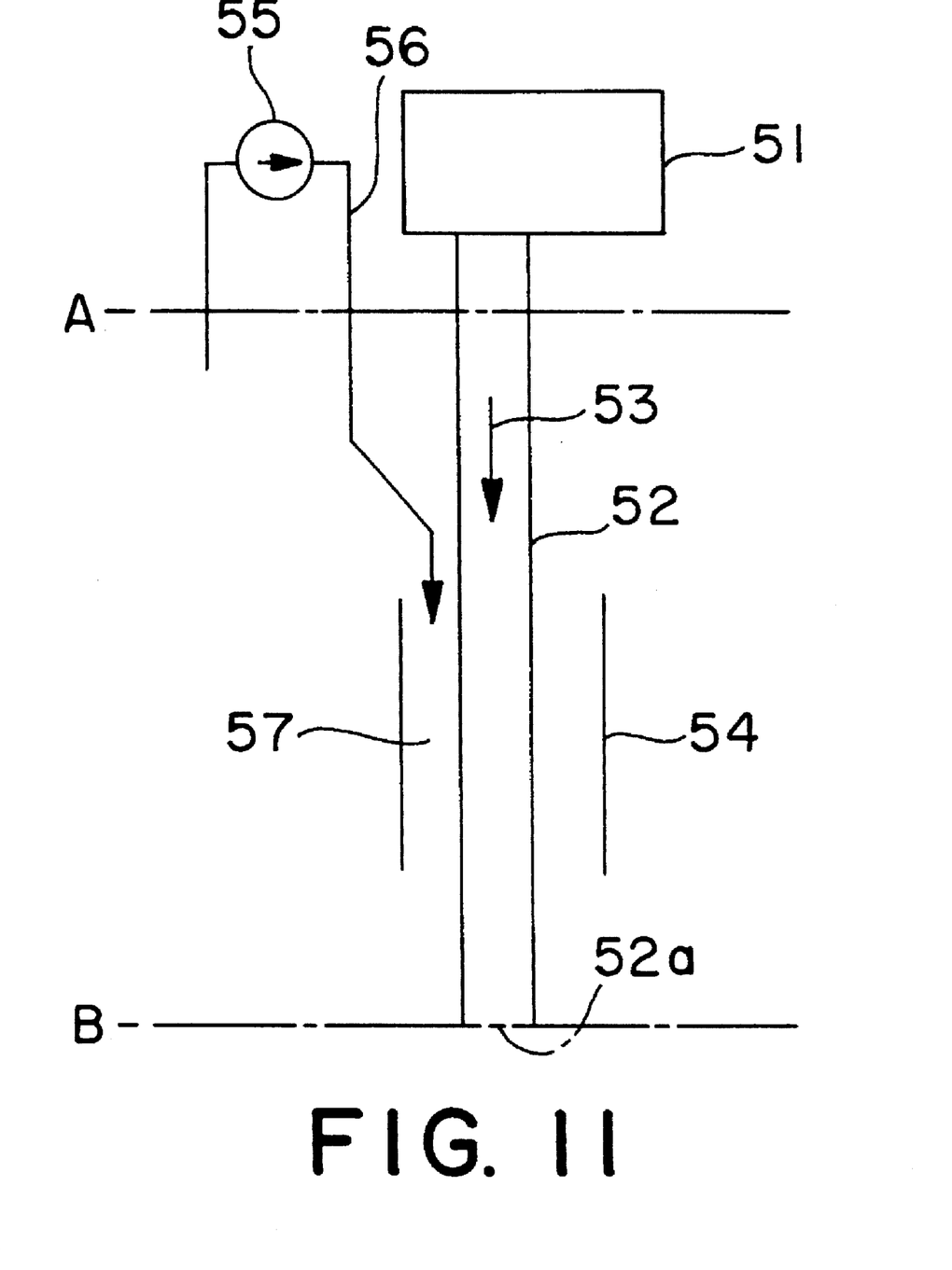
FIG. 11 is a sectional view schematically showing a low-temperature fluid abyssal casting apparatus according to a fourth embodiment of the invention.

A fourth embodiment will now be described with reference to FIGS. 11 to 13.

Also, in this embodiment, to cast the low-temperature fluid (liquefied carbonated gas) 53 to the abyss (at a depth of water of 3,000 to 4,000 m), a cylindrical casting tube 52 open to the abyss at a lower opening is provided on a base 51 on the sea. Furthermore, a cylindrical tubular member 54 is mounted coaxially with the casting tube 52 with an annular space 57 between the outer circumferential portion of the casting tube 52 and the cylindrical tubular member 54 to partially form a double tube structure for the casting tube 52.

A pump 55 is provided on the base 51 on the sea for pumping the sea water close to the sea level and pressurizing it to feed it from above to the space 57. A tube 56 is provided for coupling the outlet of the pump 55 with the upper opening of the space 57. The low-temperature fluid 53 flowing through the casting tube 52 may be heated by the sea water having a relatively high temperature in the vicinity of the sea level A.

Here, the positions of the upper opening and the lower opening of the tubular member 54 are determined as follows.

Namely, the lower opening position of the tubular member 54 is determined so that the outlet temperature of the low-temperature fluid 53 at the casting position B (for example, the depth of water, 3,000 m) may be kept at a higher level than the sea water freezing temperature (for example, 0° C.). Incidentally, in the case of liquefied carbonated gas, since the density at 0° C. is larger than that of the sea water, the liquefied carbonated gas flowing out from the lower opening 52a of the casing tube 52 descends into the sea and, there is no serious problem. However, in some cases, upon determining the position of the lower end opening of the tubular member 54, it is necessary to consider the condition that the density of the sea water would be larger than that of the low-temperature fluid, as well as the condition of the outlet temperature of the casting tube 52.

Also, upon heating the low-temperature fluid 53 with the fluid flowing through the space 57 within the tubular member 54, it is necessary to lower the temperature of the low-temperature fluid 53 below the saturated temperature at the pressure (which pressure is increased in accordance with the depth of water) at the position in the direction of the depth within the casting tube 52 (in order to prevent gasification midway along the tube 52). In view of this, the position of the upper opening of the tubular member 54 is determined.

In addition, in the case where the upper opening of the tubular member 54 is located in the vicinity of the sea level, or in the case where the overall length of the tubular member 54 is set at a longer one than a suitable length, in some cases, depending upon the conditions, the carbonated gas becomes gasified within the casting tube, so that it becomes difficult to cast the low-temperature fluid 53. Also, in the case where the overall length of the tubular member 54 is set at a shorter length than a suitable length, the outlet temperature of the low-temperature fluid 53 of the casting tube 52 is lowered so that it is impossible to solve the above-described problem.

Next, numerical experiments according to s specific amount will be explained.

A thickened wall tube whose lower end opening 52a is opened at a depth of water of 3,000 m and which has an outside diameter of 300 mm and an inside diameter of 280 mm was used as a casting tube 52. A tubular member 54 composed of a thickened wall cylindrical member having an outside diameter of 560 mm and an inside diameter of 540 mm was mounted coaxially with the outer circumferential portion of the casting tube 52 in order to form a double tube structure (length: 150 m) in a region between 100 to 250 m below the sea level of the casting tube 52. FIG. 13 illustrates a structure of the double tube portion.

The liquefied carbonated gas was cast from the upper end opening of the casting tube 52 under the condition of −55° C./0.5 MPa/186.4 kg/sec.

Furthermore, the sea water, which was kept at a temperature of 15° C., was caused to flow at a flow rate of 0.88 m/sec into the annular space of the double wall portion from above.

Figure 12:
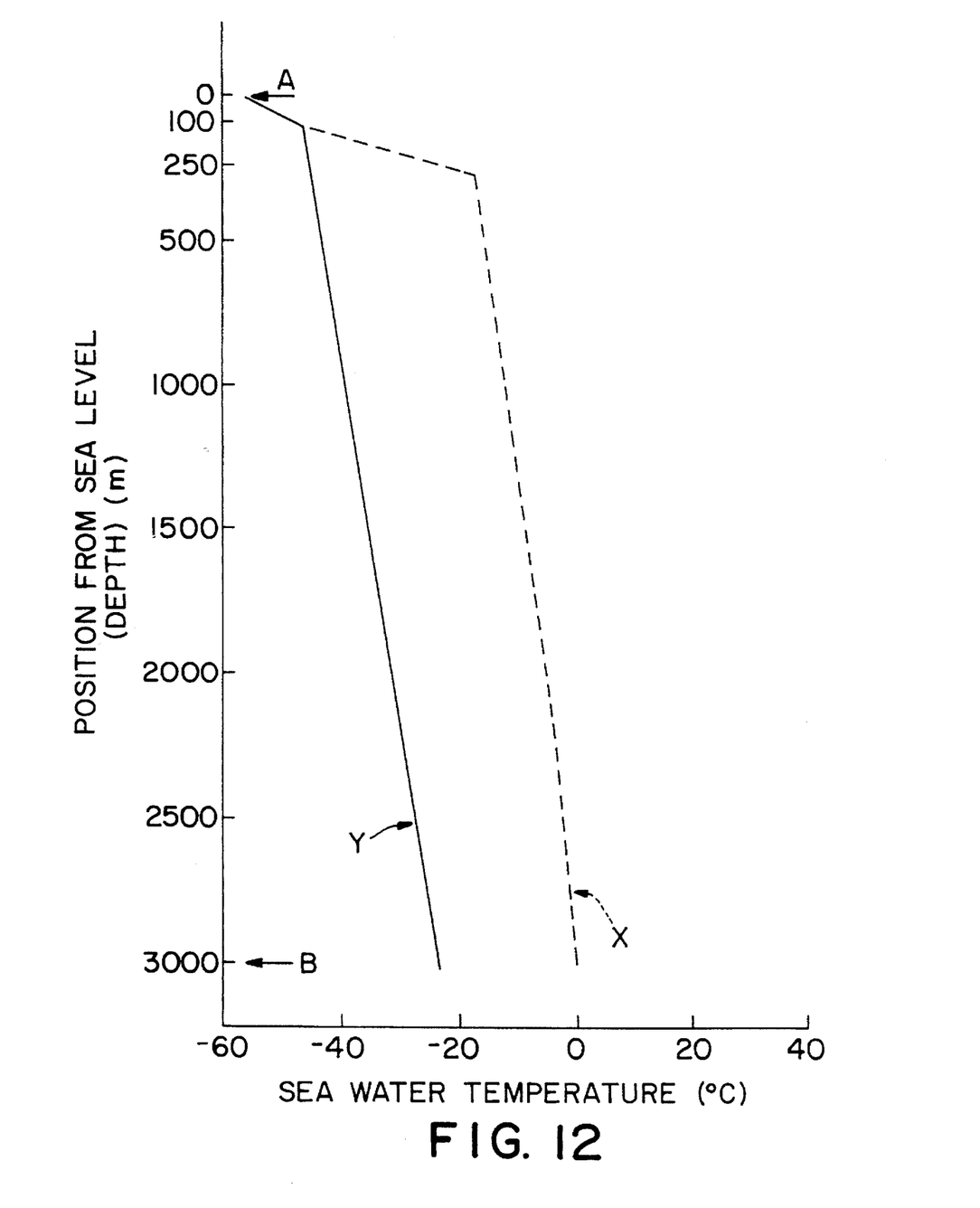
FIG. 12 is a graph showing experimental results.
Figure 13:
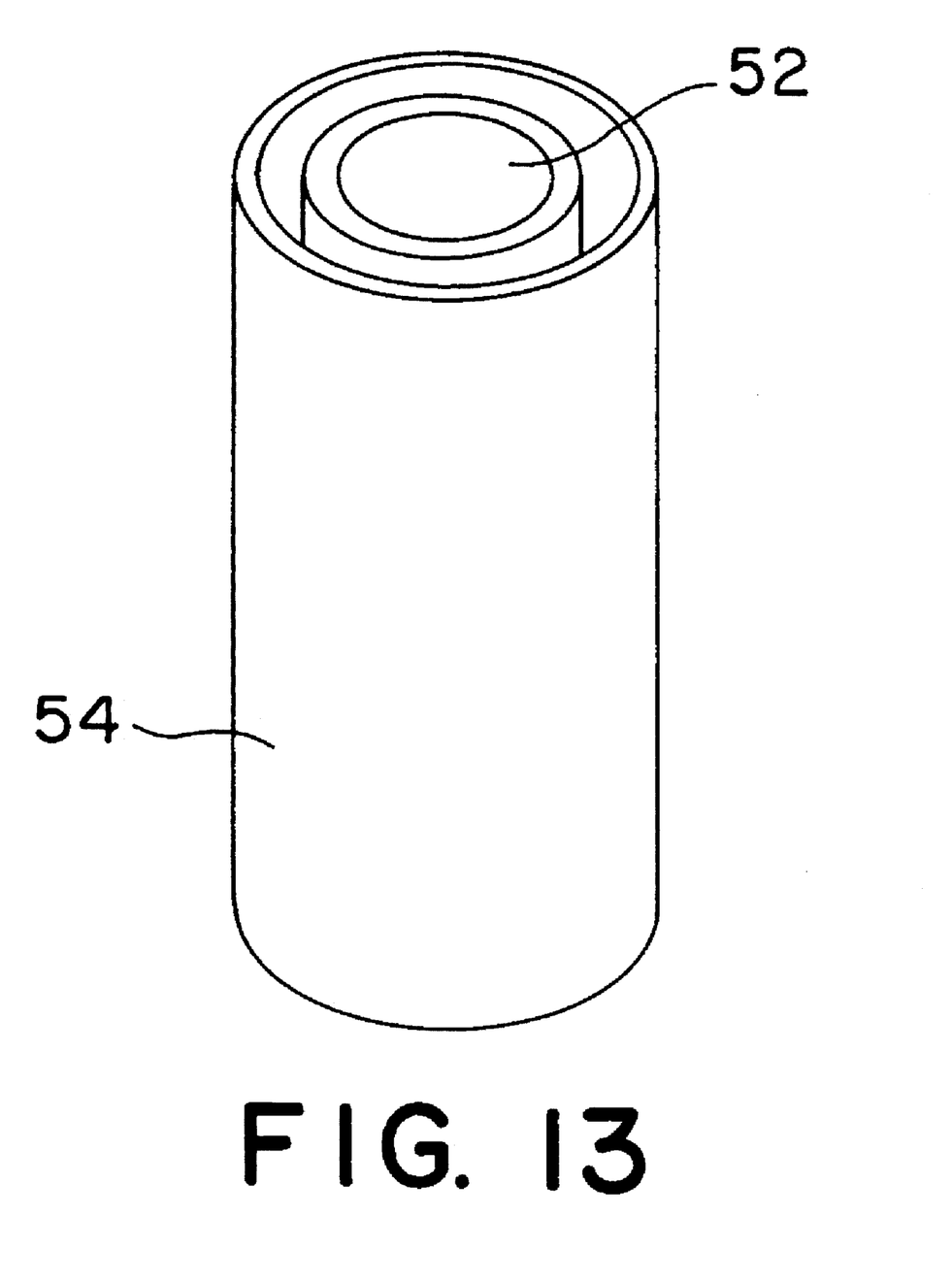
FIG. 13 is a perspective view showing a double wall tube structure of a casting tube used in the experiment.

The temperature of the liquefied carbonated gas which flowed through the casting tube 52 under the above-described conditions was shown by the result indicated by the dotted line X in FIG. 12.

Namely, it was possible to elevate the temperature of the liquefied carbonated gas at the outlet of the casting tube 52 up to about 0°. Incidentally, the temperature of the sea water which flowed out through the annular space was 10° C.

The solid line Y in FIG. 12 indicates the temperature of the liquefied carbonated gas flowing through the casting tube 52 in the case where the tubular member 54 was not provided. In this case, the outlet temperature of the liquefied carbonated gas in the casting tube 52 was about −22° C.

Thus, in the embodiment of the numeric experiments, it was possible to elevate the outlet temperature of the liquefied carbonated gas in the casting tube up to about 0° C., which is higher than the freezing point of the sea water around the tube. It was thus possible to prevent the freezing of the sea water around the lower end opening (outlet) 52a of the casting tube 52.

As described above in detail, in the low-temperature fluid abyssal casting apparatus according to the present invention, upon casting the low-temperature fluid to the abyss from the casting tube, which is open at its lower end to the abyss, it is possible to elevate the outlet temperature of the low-temperature fluid up to a temperature equal to or higher than the solidification temperature of the sea water around the tube. It is also possible to prevent the generation of defects, such as clogging of the end portion of the casting tube due to the solidification of the sea water of the casting position to the abyss. It is further possible to overcome the problem that the low-temperature fluid is gasified midway along the casing tube.

What is claimed is:

1. An abyssal casting apparatus, comprising:
   a base on the sea having a liquefied carbonated gas reservoir thereon;

a casting tube extending from said liquefied carbonated gas reservoir into the sea, said casting tube having an upper end portion mounted on said base and a lower end portion in the sea open to the sea at a casting position, said casting tube having a length of at least 3,000 m;

wherein said casting tube comprises a direct heating portion directly heated by sea water therearound for heating liquefied carbonated gas in said casting tube, said direct heating portion extending a length of at least 100 m from the sea level;

wherein said casting tube further comprises an upstream casting tube portion and a downstream casting tube portion located upstream and downstream of said direct heating portion, respectively; and a forcible heating device comprising a fluid pump connected to a heating fluid source and to one of said upstream casting tube portion and said downstream casting tube portion.

2. The abyssal casting apparatus of claim 1, wherein said direct heating portion extends between the sea level and the temperature boundary layer of the sea.

3. The abyssal casting apparatus of claim 2, wherein said direct heating source comprises antifreeze as a heating fluid.

4. The abyssal casting apparatus of claim 2, wherein said heating fluid source comprises sea water as a heating fluid.

5. The abyssal casting apparatus of claim 4, wherein said forcible heating device comprises a heat exchanger on said base in communication with said upstream casting tube portion, said fluid pump is a sea water pump for feeding sea water to said heat exchanger, and said casting tube further comprises a plurality of pressure adjusting devices in said casting tube for adjusting the pressure of liquefied carbonated gas therein.

6. The abyssal casting apparatus of claim 4, wherein said forcible heating device comprises a tubular member mounted on said downstream casting tube portion downstream of said direct heating portion around an outer circumferential portion of said casting tube, defining a space between said tubular member and said casting tube, said fluid pump being connected to said space for sea water into said space.

7. The abyssal casting apparatus of claim 6, wherein said tubular member is located at a depth of at least 400 m, said forcible heating device defining a means for heating liquefied carbonated gas in said casting tube to a temperature at said lower end portion in a range of −1 to 5 degrees C.

8. The abyssal casting apparatus of claim 1, wherein said fluid pump is connected to said downstream casting tube portion, said downstream casting tube portion comprising a double casting tube having an inner tube for liquified carbonated gas and an outer passage for heating fluid.

9. The abyssal casting apparatus of claim 8, wherein said forcible heating device defines a closed heating fluid loop that comprises said fluid pump, said heating fluid source and said double casting tube.

* * * * *